(12) United States Patent
Mast et al.

(10) Patent No.: US 6,986,628 B2
(45) Date of Patent: *Jan. 17, 2006

(54) DRILL INSERT GEOMETRY HAVING V-NOTCHED WEB

(75) Inventors: Wendell E. Mast, Dundee, OH (US); Joseph P. Nuzzi, Dover, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 176 days.

This patent is subject to a terminal disclaimer.

(21) Appl. No.: 10/771,177

(22) Filed: Feb. 2, 2004

(65) Prior Publication Data

US 2004/0179913 A1 Sep. 16, 2004

Related U.S. Application Data

(63) Continuation-in-part of application No. 09/975,221, filed on Oct. 11, 2001, now Pat. No. 6,685,402.
(60) Provisional application No. 60/278,977, filed on Mar. 27, 2001.

(51) Int. Cl.
*B23B 51/02* (2006.01)

(52) U.S. Cl. .................... 408/227; 408/233; 408/713
(58) Field of Classification Search ............ 408/227, 408/229, 230, 223, 224, 233, 713, 228
See application file for complete search history.

(56) References Cited

U.S. PATENT DOCUMENTS

| | | |
|---|---|---|
| 1,069,930 A | 8/1913 | Down |
| 1,467,491 A | 9/1923 | Oliver |
| 3,199,381 A | 8/1965 | Mackey |
| 3,564,947 A | 2/1971 | Maier |
| 4,060,335 A | 11/1977 | Holloway et al. |
| 4,381,162 A | 4/1983 | Hosoi |
| 4,583,888 A | 4/1986 | Mori et al. |
| 4,728,231 A | 3/1988 | Kunimori et al. |

(Continued)

FOREIGN PATENT DOCUMENTS

| | | |
|---|---|---|
| DE | 299 10 559 U | 10/1999 |
| EP | 0 441 302 A | 8/1991 |
| EP | 0 589 858 A | 3/1994 |
| FR | 2 797 599 A | 2/2001 |
| GB | 842 133 A | 7/1960 |

OTHER PUBLICATIONS

Thomas J. Drozda and Charles Wick, "Tool and Manufacturing Engineers Handbook", vol. 1, Machining, Fourth Edition, Society of Manufacturing Engineers, Chapter 9, pp. 50–53 (1983).
Guhring, Interchangeable Insert Drill GT800WP, Specification Sheet (2 pages).
Yestool, Printout from Yestool Website (3 pages).
Frank M. Butrick, "How To Sharpen Spade Drills—Standard and Special," Spade–Drill Engineering Series, 6 pages, (1971).

*Primary Examiner*—Daniel W. Howell
(74) *Attorney, Agent, or Firm*—Hahn Loeser & Parks, LLP; Robert J. Clark (57) ABSTRACT

The present invention relates to a V-notched web formed on a drill insert of a drill tool assembly. The V-notched web allows greater stability and feed rates, while decreasing the heat generated at the insert tip. The present invention is provided by a drill insert comprising a drill insert body having at least two cutting edges, a web between the two cutting edges, and a web thinning notch formed on either side of the web. Each web thinning notch forms a notch cutting edge having a positive rake angle.

19 Claims, 6 Drawing Sheets

U.S. PATENT DOCUMENTS

| | | |
|---|---|---|
| 5,228,812 A | 7/1993 | Noguchi et al. |
| 5,474,407 A | 12/1995 | Rödel et al. |
| 5,590,987 A | 1/1997 | Bouzounie |
| 5,599,145 A | 2/1997 | Reinauer et al. |
| 5,947,660 A | 9/1999 | Karlsson et al. |
| 5,957,635 A | 9/1999 | Nuzzi et al. |
| 6,036,410 A | 3/2000 | Shun'ko |
| 6,056,486 A * | 5/2000 | Colvin .................. 408/59 |
| 6,132,149 A | 10/2000 | Howarth et al. |
| 6,135,681 A | 10/2000 | Nuzzi et al. |
| 6,371,702 B1 | 4/2002 | DeWald et al. |
| 6,685,402 B2 * | 2/2004 | Mast et al. ............ 408/227 |

* cited by examiner

DRILL INSERT GEOMETRY HAVING V-NOTCHED WEB

TECHNICAL FIELD

This application is a continuation-in-part of U.S. application Ser. No. 09/975,221 filed Oct. 11, 2001, now issued as U.S. Pat. No. 6,685,402, which claims the benefit of U.S. Provisional Application No. 60/278,977, filed Mar. 27, 2001, all of which are hereby incorporated by reference. The invention relates generally to a cutting insert to be placed into a tool holder for boring holes into metals. More specifically, the invention relates to a cutting tool insert having a specialized geometry at the web of the insert, allowing increased stability at various feed rates.

BACKGROUND OF THE INVENTION

Drilling systems are frequently used to provide cylindrical holes in metallic workpieces. The cutting or boring action of the drill system may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of cutting inserts allows for quick changing of the insert upon wear of the cutting surfaces instead of the entire tool, and allows for one tool to be used for a variety of different boring applications by simply changing the insert and not the entire drill assembly.

One problem with prior art cutting tools is that the point or tip of the insert does not efficiently cut into the workpiece. This is due to negative or neutral rake angles formed by web thinning techniques near the chisel of the insert. This results in deformation of the workpiece rather than cutting, which increases the heat produced at the drill insert point. Furthermore, the prior art insert geometry could result in instability, which can cause deviations in the dimensions of the hole being bored, also known as runout and/or bellmouthing which is undesirable. Additionally, prior art drill systems and inserts were configured such that chips from the drilling process were not formed efficiently, causing deterioration of the cutting surfaces. The configuration of the cutting surfaces also did not allow for producing positive rakes in association with chip removal flutes to facilitate chip formation.

SUMMARY OF THE INVENTION

The present invention provides a novel drill insert having a V-notched web. The V-notched web allows greater stability and feed rates, while decreasing the heat generated at the insert tip. The stability of the V-notch can further enhance the self-centering capability of existing self-centering configurations of drill inserts. These and other objects of the invention are provided by a drill insert comprising a drill insert body having at least two cutting edges, a web between the two cutting edges, and a web thinning notch formed on either side of the web. Each web thinning notch forms a notch cutting edge having a positive rake angle. These and other objects of the invention are also provided by a drilling tool assembly comprising a holder having a body portion and a head portion, the head portion having a recess formed on one end thereof and a drill insert body securely insertable within the recess of the holder. The drill insert body has at least two cutting edges, a web between the two cutting edges, and a web thinning notch formed on either side of the web. Each web thinning notch forms a notch cutting edge having a positive rake angle.

BRIEF DESCRIPTION OF THE DRAWINGS

The invention and developments thereof are described in more detail in the following by way of embodiments with reference to the drawings, in which.

DETAILED DESCRIPTION OF THE INVENTION

Figure 1:
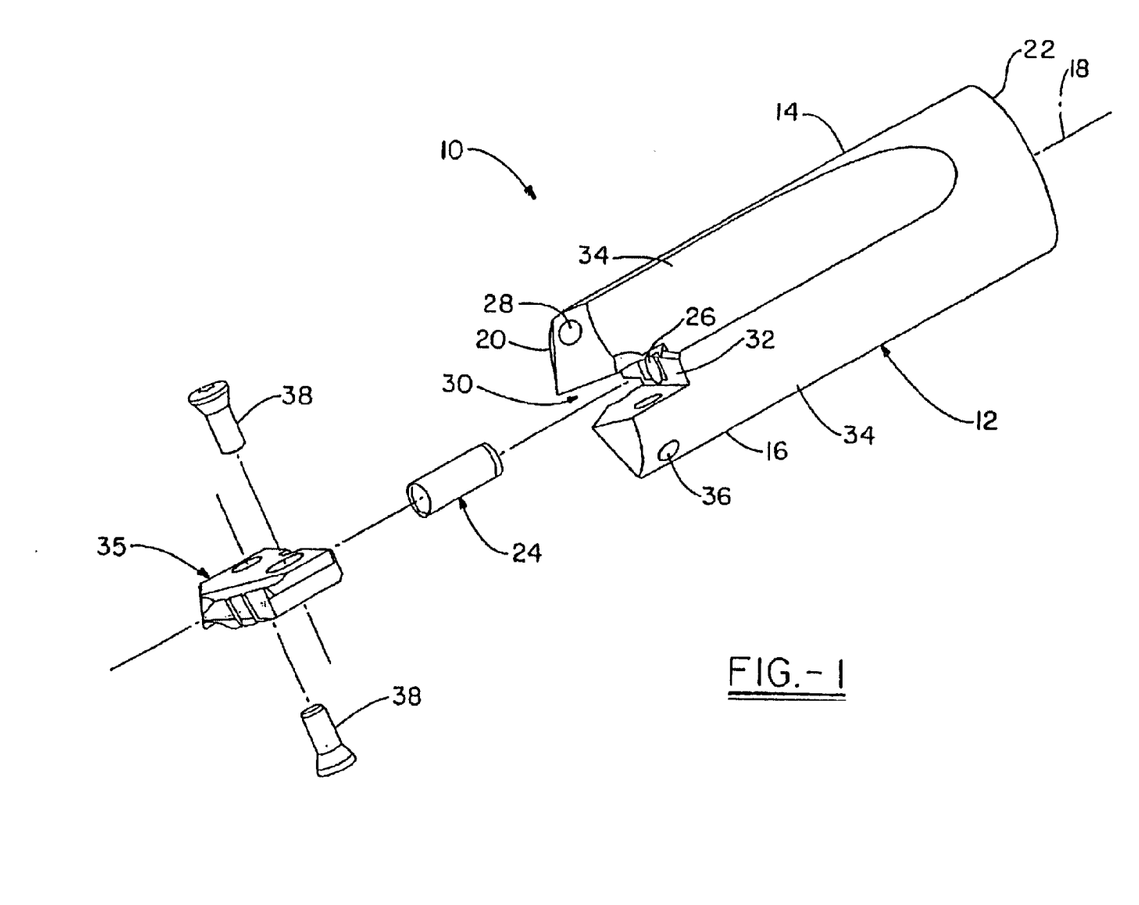
FIG. 1 is an exploded assembly view of the drill tool assembly according to a preferred embodiment.
Figure 2:
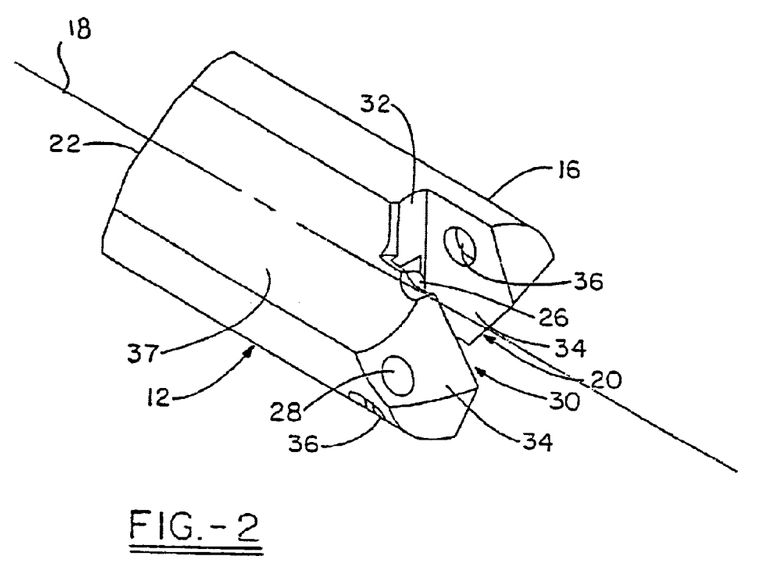
FIG. 2 is a partial perspective view of the holder associated with the assembly.

Turning now to a preferred embodiment of the invention, FIG. 1 illustrates a drill tool assembly 10 generally indicated. Drill tool assembly 10 comprises a holder 12, which has a body 14 and head portion 16 associated therewith. In the preferred embodiment, holder 12 has, in general, a cylindrical shape with a first end 20 and second end 22. As shown in FIG. 2, the first end 20 of holder 12 has a clamping or holder slot 30, which may extend across the entire diameter of the head portion 16 or, at least, over a center portion thereof at the general location of the rotational axis 18 of holder 12. The holder slot 30 has a bottom wall 32 positioned in substantially perpendicular orientation relative to the rotational axis 18 of the holder 12. In the preferred embodiment, the assembly 10 may further include a locating boss or dowel pin 24, which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit relationship to position pin 24. Alternatively, the locating boss, which, in the preferred embodiment, comprises pin 24, may be configured in another manner to achieve the corresponding functionality of pin 24, such as an integral member extending from bottom wall 32. Within the holder slot 30, a drill insert 35 is precisely positioned with respect to the holder 12 to perform the desired drilling function in conjunction therewith. As will be hereinafter described in more detail, the insert 35 has a point geometry comprising a plurality of cutting surfaces, which are precisely positioned with respect to the axis 18 of the holder 12 to minimize errors in a resulting drilling operation using assembly 10.

More particularly, the preferred embodiment of holder 12 is shown in FIG. 2, and may be configured to include at its first end 20 a pair of clamping arms 34, which extend about holder slot 30. The clamping arms 34 preferably include apertures 36, which accommodate screws 38 (see FIG. 1) to secure the drill insert 35 in its position within the holder slot 30. In the preferred configuration, the holes 36 are threaded to engage screws 38, and mate with screw holes formed in the drill insert 35 in a predetermined manner to precisely locate the drill insert in a predetermined location within holder slot 30, as will be described in more detail. Each of the clamp arms 34 may also include a lubrication vent 28, which allows the application and flow of lubrication adjacent the cutting surfaces of the drill insert to facilitate the drilling operation. The clamp arms 34 may also include angled or curved surfaces, which facilitate chip removal via chip evacuating grooves 37 on each side of the holder 12. The seating surface 32 is also shown to be designed as a planar surface, which corresponds to the planar bottom portion of the preferred drill insert 35, although another configuration of bottom surface 32 may be employed and is contemplated herein.

Figures 3A, 3B, 3C, 3D, 3E:
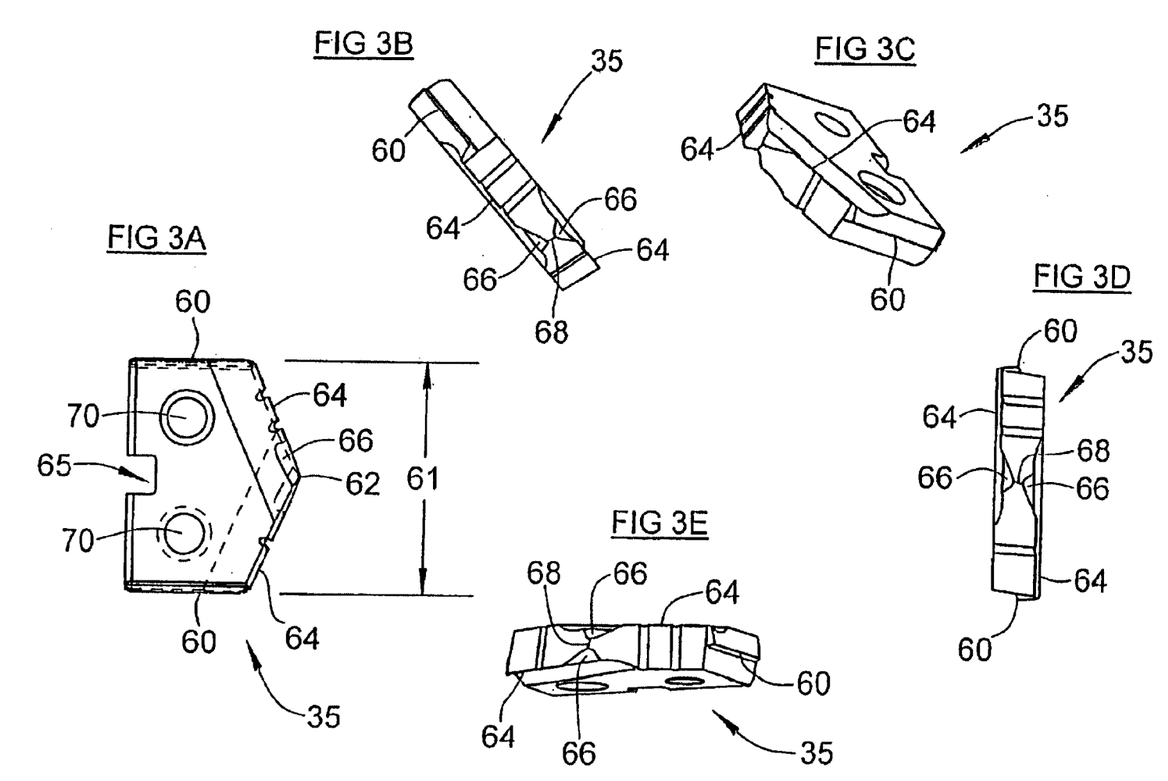
FIGS. 3A–3E are a variety of different views of an insert according to a first embodiment of the present invention having a flat chisel.

Turning to FIG. 3A, a first embodiment of the drill insert 35 is shown. The drill insert 35 may form a spade drill blade, with side edges 60 of the blade being generally parallel with the rotational axis 18 of the holder 12 once the insert 35 is positioned and secured with holder 12. When secured with holder 12, drill insert 35 will also have a rotational axis, which desirably is coaxial with axis 18 of holder 12. The drill insert 35 will also have a width 61, which, upon being rotated with holder 12, forms an outside diameter of the assembled tool. The drill insert 35 further includes cutting edges 64 on its upper surface in the form of an obtuse V-shape, with cutting edges 64 on each side of the axial center 62, also known as the dead center. The cutting edges 64 may include a plurality of cutting components, which cooperate together to provide the desired cutting surface 64 for the material and/or drilling application. In general, the insert 35 is designed to cut when rotationally driven in conjunction with holder 12 in a predetermined direction, and is not reversible, although such drilling blade configurations are known to those skilled in the art and could be used in conjunction with the present invention if desired. The drill insert 35 further preferably includes apertures 70, which cooperate with the apertures 36 in clamp arms 34 to secure insert 35 within holder slot 30 and seated against seating surface 32. Additionally, each of the apertures 36 and 70 are preferably formed with countersunk portions formed as a bearing surface adapted to be engaged by a corresponding tapered or like surface on the screws or other fastening mechanism 38. The enlarged clamping head of the screws 38 may be of any convenient shape, such as conical, ball-shaped, or in another form to correspond with the similar surfaces in the tool holder 12 and insert 35. In a typical fashion, by offsetting the axes of the apertures 36 and 70, upon securing insert 35 within slot 30 by means of screws 38, the insert 35 will be forced downwardly against the seating surface 32. Insert 35 may include a locating slot 65, which allows positioning of the locating pin 24 therein. This connection is further described in co-owned U.S. Pat. No. 5,957,635, which is herein incorporated by reference.

Insert 35 also includes a notch feature 66 as best shown in FIGS. 3B–3E. A notch 66 is located on either side of the chisel 68, which is formed across the insert web and extends through axial center 62. A negative feature of drill inserts and twist drills, in general, is that the chisel must act as a cutting edge. The chisel 68 has a negative rake angle, which does not cut efficiently but rather deforms the metal. This results in high thrust forces being required and excessive heat being developed at the point 62. The notch 66 forms a type of flute on either side of insert 35, which reduces the web and length of chisel 68. Prior art notches typically were formed as a full radius. The prior art notches provide a neutral cutting edge, which still does not efficiently cut but rather extrudes or deforms the metal. The notch of the present invention 66 is formed having a small radius R at the bottom of the notch, which extends outward from the radius center along linear legs forming the leading and trailing notch sides of the notch 66. This creates a positive rake along the cutting edge of the notch 66, which cuts the material by forming a chip and minimizes extrusion or deforming of the metal during cutting operations. The positive rake of the notch 66 allows the insert cutting surfaces to bite into the workpiece in a more aggressive fashion, which results in higher feed rates and increased stability while, at the same time, creating less heat generated at the tip of the insert 35. In drills having a flat chisel (such as in FIGS. 3A–3E), there is a tendency for the drill to walk around the chisel during drilling operations resulting in runout and wander of the drilled hole. The notch 66 helps improve the self-centering capability of the drill insert 35.

Figures 4A, 4B, 4C, 4D, 4E:
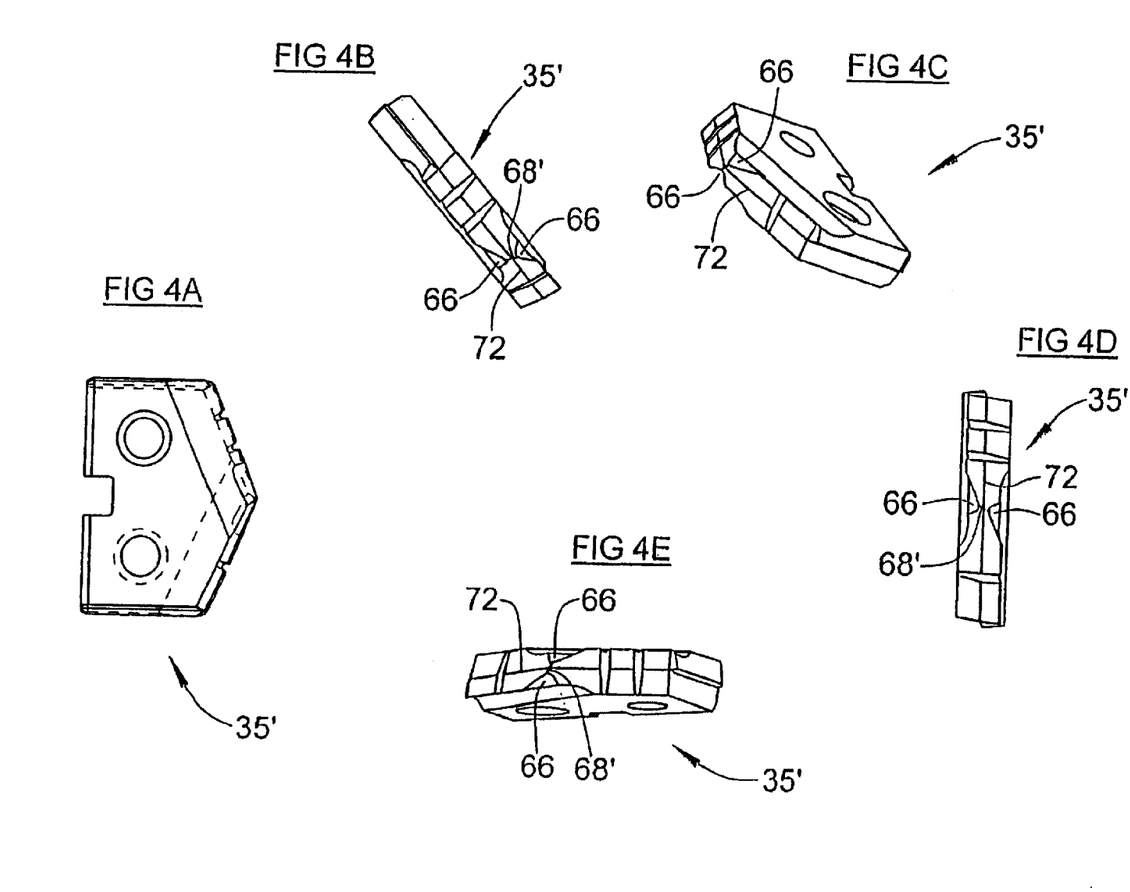
FIGS. 4A–4E are a variety of different views of an insert according to a second embodiment of the present invention having a multifaceted chisel.
Figure 5A:
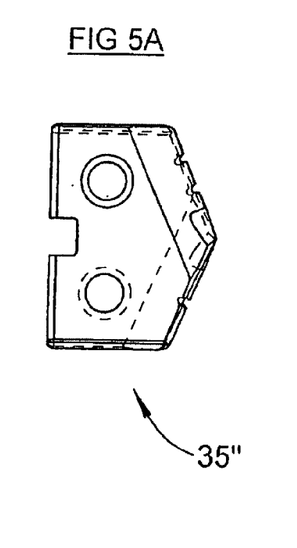
FIGS. 5A–5E are a variety of different views of an insert according to a third embodiment of the present invention having a multifaceted chisel and reduced clearance cut.
Figure 5B:
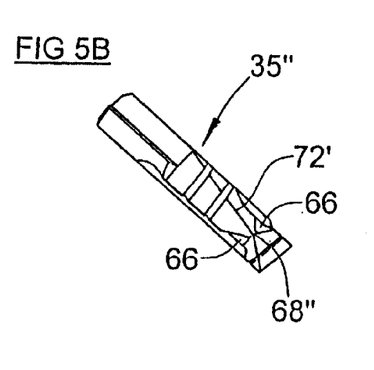
Figure 5C:
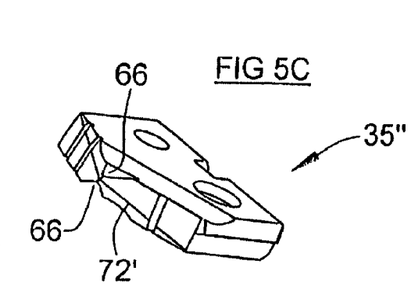
Figure 5D:
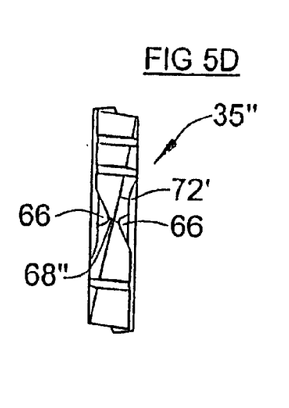
Figure 5E:
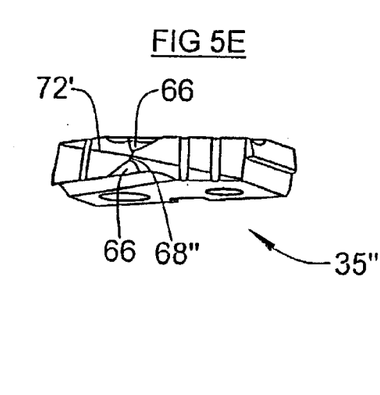
Figures 6A, 6B, 6C, 6D:
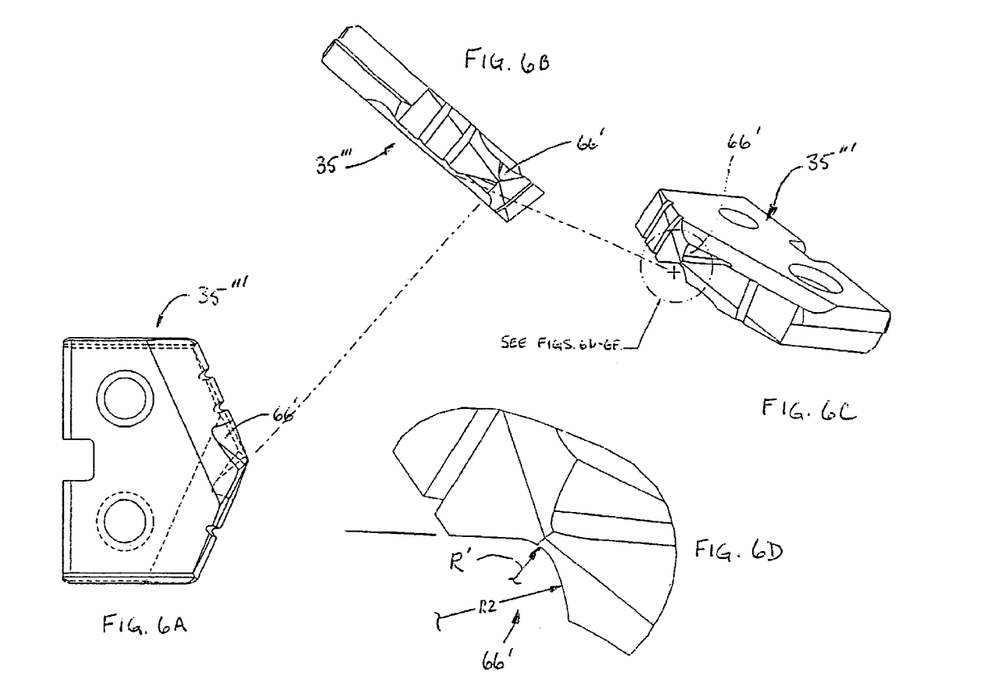
FIGS. 6A–6F are a variety of different embodiments of the notch of the present invention.
Figure 6E:
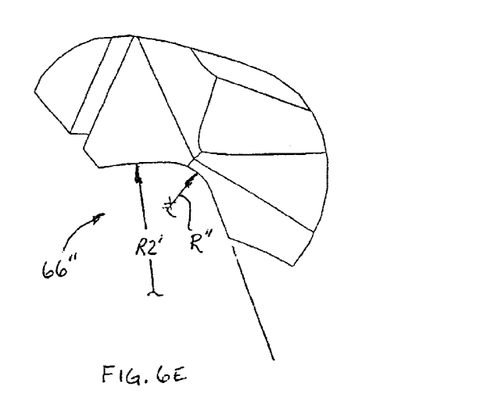
Figure 6F:
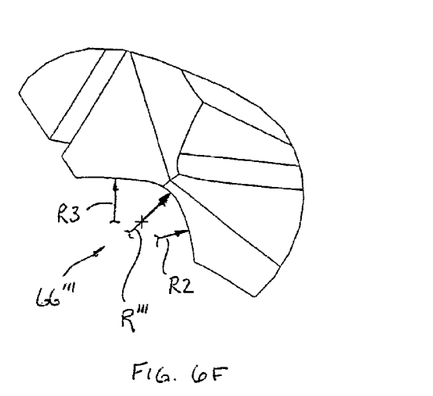

That the notch 66 can also be used with an insert having a self-centering configuration, as shown in FIGS. 4–5. In FIGS. 4A–4E, a multi-faceted chisel point 68' is shown on a drill insert 35'. Chisel 68' is created by a clearance cut 72 along a longitudinal center line of insert 35', which is parallel to the cutting edges 64. The multi-faceted chisel point 68' is not as apt to wander as a flat chisel 68 which results in a self-centering characteristic of the chisel 68'.

In FIGS. 5A–5E, a second configuration of a multi-faceted chisel point 68" is shown on insert 35". Chisel 68" is created by a diagonal clearance cut 72' extending through the center point 62 of chisel 68" from each trailing edge corner. The diagonal clearance cut 72' increases the strength of the insert 35 by removing less metal than as shown in the previous clearance cut 72, while retaining the multi-faceted chisel point 68". As with the previous embodiment, the multi-faceted chisel point 68" is not as apt to wander as a flat chisel 68 which results in a self-centering characteristic of the chisel 68".

To increase stability of the drill insert, the angle of the chisel can be optimized to allow a longer or shorter chisel. The chisel angle optimization is a function of the location and depth of the V-notch 66 as well as the clearance angles. It is contemplated that the drill insert is made of a sintered metallic hard material such as carbide, cermet, ceramic, monocrystalline and polycrystalline diamond, or boron nitride. However, the drill insert may also be comprised of high speed steel.

As previously mentioned, the notch 66 has a notch cutting edge having a positive rake angle. In the embodiments shown above, the notch 66 has a leading notch side and a trailing notch side that are generally planar surfaces and the notch cutting edge is generally linear. Referring now to FIGS. 6A–6F, alternate embodiments of the notch are shown wherein one or more of the notch sides are curved instead of planar. The notches 66', 66", 66''' remain generally "V" shaped, however, notch 66' has a trailing notch surface that is formed as a second radius R2, notch 66" has a leading notch surface formed at a second radius R2', and notch 66''' has a trailing notch surface that is formed as a second radius R2 and a leading notch surface formed at a third radius R3. The second and third radii R2, R2', and R3 blend with the radius R', R", R''' of the notch apex providing a smooth transition. Radius R is shown as generally smaller than R2, R2' and R3, whereas R2 and R3 are shown as generally equivalent. Although not shown, other combinations and sizes of simple and compound notch radii are also contemplated that will provide a notch cutting edge having a positive rake angle.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A drill insert comprising:
   a drill insert body having at least a first side and a second side,
   wherein the second side comprises at least two cutting edges formed transverse to each other, a web formed between the two cutting edges, and a web thinning notch formed on either side of the web;
   wherein each notch forms a notch cutting edge having a positive rake angle, wherein the notch cutting edge is curved along its entire length.

2. The drill insert of claim 1, wherein each notch has a cross-sectional geometry in the form of a "V" having an apex of the notch formed at a first radius and a leading notch side wall formed as a second radius.

3. The drill insert of claim 2, wherein the first radius is smaller than the second radius.

4. The drill insert of claim 2, wherein a trailing notch side wall is formed as a third radius.

5. The drill insert of claim 4, wherein the first radius is smaller than the third radius.

6. The drill insert of claim 4, wherein the second radius is equal to the third radius.

7. The drill insert of claim 4, wherein the second radius not equal to the third radius.

8. The drill insert of claim 1, wherein the first side of the drill body is a generally planar surface having at least one recess formed in the first side.

9. A drill insert comprising:
   a drill insert body having at least a first side, a second side, and at least two apertures,
   wherein the first side of the drill body is a generally planar surface having at least one recess formed in the first side;
   wherein the second side comprises at least two cutting edges formed transverse to each other, a web formed between the two cutting edges, and a web thinning notch formed on either side of the web;
   wherein each notch forms a notch cutting edge adjacent to and radially inward from one cutting edge of the at least two cutting edges, wherein each notch cutting edge has a positive rake angle; and
   wherein each notch has a cross-sectional geometry in the form of a "V" having a radius at the apex of the notch and transitioning to substantially linear side walls.

10. A drill insert comprising:
    a drill insert body having at least a first side, a second side, and at least two apertures,
    wherein the first side of the drill body is a generally planar surface having at least one recess formed in the first side;
    wherein the second side comprises at least two cutting edges formed transverse to each other, a web formed between the two cutting edges, and a web thinning notch formed on either side of the web;
    wherein each notch forms a notch cutting edge adjacent to and radially inward from one cutting edge of the at least two cutting edges, wherein each notch cutting edge has a positive rake angle; and
    wherein each notch is generally V-shaped wherein each notch has at least one notch cross-section along a length of the notch having a radius at the apex of the notch and the notch cross-section transitioning from each end of the radius at the apex of the notch to substantially linear portions forming the V-shape.

11. A drill insert comprising:
    a drill insert body having at least a first side and a second side;
    wherein the second side comprises at least two cutting edges formed transverse to each other, a web formed between the two cutting edges, and a web thinning notch formed on either side of the web;
    wherein each notch forms a notch cutting edge having a positive rake angle;
    wherein each notch has a cross-sectional geometry in the form of a "V" having an apex of the notch formed at a first radius, a trailing notch side wall formed at a second radius, and a leading notch side wall formed at a third radius.

12. The drill insert of claim 11, wherein the first radius is smaller than the third radius.

13. A drill insert comprising:
    a drill insert body having at least a first side and a second side;
    wherein the second side comprises at least two cutting edges formed transverse to each other, a web formed between the two cutting edges, and a web thinning notch formed on either side of the web;
    wherein each notch forms a notch cutting edge having a positive rake angle;
    wherein each notch has a cross-sectional geometry in the form of a "V" having an apex of the notch formed at a first radius, a leading notch side wall formed at a second radius, and a substantially planar trailing notch side wall.

14. The drill insert of claim 13, wherein the drill insert body is comprised of high speed steel.

15. The drill insert of claim 13, wherein the apex of the notch is formed along an angle transverse to a rotational axis of the drill insert.

16. The drill insert of claim 11, wherein the second radius is equal to the third radius.

17. The drill insert of claim 11, wherein the second radius is not equal to the third radius.

18. The drill insert of claim 13, wherein the first side of the drill body is a generally planar surface having at least one recess formed in the first side.

19. The drill insert of claim 13, wherein the drill insert body is comprised of a material selected from the group consisting of carbide, cermet, ceramic, monocrystalline and polycrystalline diamond, and boron nitride.

* * * * *